C. A. KURZ.
AUTOMOBILE LOCK.
APPLICATION FILED FEB. 12, 1918.

1,301,576.

Patented Apr. 22, 1919.
2 SHEETS—SHEET 1.

INVENTOR
Carl A. Kurz

WITNESSES
Guy M. Spring
Ross J. Woodward

BY Richard B. Owen
ATTORNEY

C. A. KURZ.
AUTOMOBILE LOCK.
APPLICATION FILED FEB. 12, 1918.
1,301,576. Patented Apr. 22, 1919.
2 SHEETS—SHEET 2.
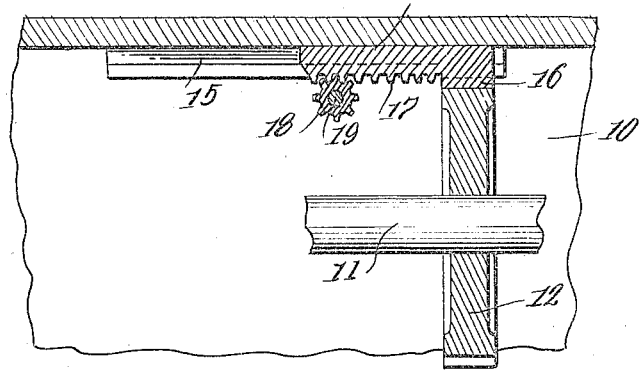
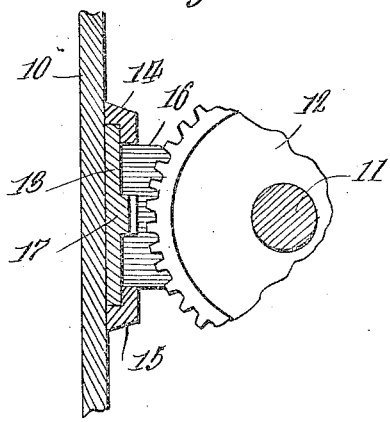
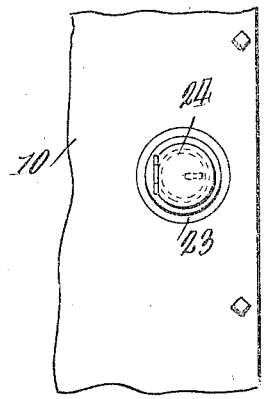
INVENTOR
Carl A. Kurz
WITNESSES
BY
ATTORNEY

UNITED STATES PATENT OFFICE.

CARL A. KURZ, OF COLUMBUS, OHIO.

AUTOMOBILE-LOCK.

1,301,576.  Specification of Letters Patent.  Patented Apr. 22, 1919.

Application filed February 12, 1918. Serial No. 216,772.

*To all whom it may concern:*

Be it known that I, CARL A. KURZ, a citizen of the United States, residing at Columbus, in the county of Franklin and State of Ohio, have invented certain new and useful Improvements in Automobile-Locks, of which the following is a specification.

This invention relates to an improved lock or clutch for use in connection with the chassis of an automobile and the principal object of the invention is to provide a lock of the character described so constructed that when placed, one of the gears of the transmission may be engaged and held against rotation thus preventing the transmission from operating.

Another object of the invention is to so construct this lock that it will require a key to operate the same thus preventing it from being moved to an inoperative position by unauthorized persons.

Another object of the invention is to provide a lock of the character described which does not require any special type of transmission, it being simply necessary to provide a gear which can be engaged by the lock.

Another object of the invention is to provide a transmission of the character described which will be simple in construction and strong and durable and not liable to easily break or get out of order.

This invention is illustrated in the accompanying drawings, wherein:—

Fig. 3 is a sectional view taken along the line 3—3 of Fig. 2;

Fig. 4 is a fragmentary sectional view through the improved lock; and

Fig. 5 is a top plan view showing a portion of the transmission above the locking means.

This improved lock is used in connection with a transmission which will be mounted in the transmission housing or casing 10. This transmission will be of a conventional construction and will include a shaft 11 carrying a gear wheel 12. The lock will be mounted at a convenient point within the transmission casing and in the present form is shown connected with the side walls of the casing. It is understood that this arrangement may be varied according to the type of transmission with which the lock is used.

Figure 1:
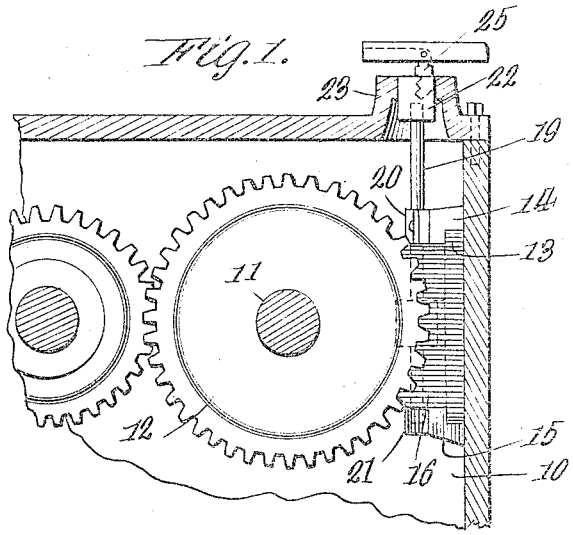
Figure 1 is a view showing the improved locking means in end elevation and in operative relation to a portion of a transmission shown in section.
Figure 2:
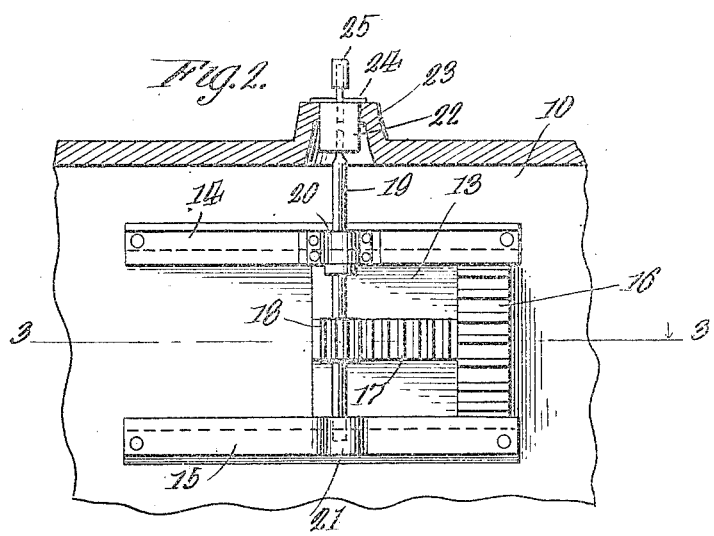
Fig. 2 is a view showing the improved locking device in side elevation.

The lock is provided with a sliding plate 13 slidably mounted through the medium of the upper and lower tracks 14 and 15 and carries a clutch head 16 and a rack 17 which rack extends longitudinally of the plate 13 and is engaged by the pinion 18 mounted upon the turning shaft 19. This turning shaft 19 is rotatably mounted in the bearings 20 and 21 of the tracks 14 and 15 and has its upper end portion extended and fitting into the body of a conventional lock 22. This lock 22 is of the conventional type and is mounted in a socket 23 carried by the transmission casing and provided with a cover 24 which may be swung downwardly to cover the lock when the lock is not in use. The key 25 will be inserted in the key-hole of the lock 23 and through the medium of this key, the lock may be turned to rotate the shaft 19 and thus move the head 16 either into or out of engagement with the gear 12. When in engagement with the gear, the teeth mesh and the transmission cannot be operated. When the lock is in the operative position as shown in Fig. 3, it will be readily seen that the transmission cannot be moved and from an inspection of Figs. 1 and 2 it will be readily seen that unless a person has a key, it will be impossible to rotate the shaft 19 and therefore unauthorized persons cannot move the lock to an inoperative position. It will be further noted that this lock will be very strong and durable and that there will be no danger of breaking the lock.

What is claimed is:—

The combination with a transmission including a casing having a rotatably mounted shaft therein with a gear rigid upon the shaft; of parallel laterally spaced tracks mounted on said casing, bearings on said tracks, a shaft rotatably mounted in said bearings with one end provided with a lock, a pinion carried by said shaft, a plate mounted to slide on said tracks, a toothed head carried by said plate for engaging the gear when the plate is in one position, a rack carried by said plate meshing with said pinion, and means for actuating said lock to turn the pinion carried shaft whereby the head is brought into and out of engagement with the transmission gear to lock the latter or release it at the will of the operator.

In testimony whereof I affix my signature in presence of two witnesses.

CARL A. KURZ.

Witnesses:
 Louis L. Wilson,
 T. O. Reed.